United States Patent [19]

Okabayashi et al.

[11] Patent Number: 5,215,684
[45] Date of Patent: Jun. 1, 1993

[54] ELECTROLYTE FOR ELECTROCHROMIC ELEMENTS

[75] Inventors: Katsuaki Okabayashi, Tokyo; Takahiko Asaoka; Katsushi Abe, both of Aichi; Shiaki Hyodo; Toshiyasu Ito, both of Aichi, all of Japan

[73] Assignees: Kabushiki Kaisha Toyota Chuo Kenkyusho; Toyoda Gosei Co., Ltd., both of Aichi, Japan

[21] Appl. No.: 845,850

[22] Filed: Mar. 6, 1992

Related U.S. Application Data

[63] Continuation of Ser. No. 515,437, Apr. 27, 1990, abandoned.

[30] Foreign Application Priority Data

Apr. 28, 1989 [JP] Japan .................. 1-111216

[51] Int. Cl.$^5$ .............................. G02F 1/01; F21V 9/00
[52] U.S. Cl. ............................... 252/582; 359/265; 359/270; 359/273; 252/586
[58] Field of Search ............... 252/582, 586; 359/265, 359/270, 273

[56] References Cited

U.S. PATENT DOCUMENTS

| | | | |
|---|---|---|---|
| 3,560,078 | 2/1971 | McIntyre et al. | 359/270 X |
| 4,550,982 | 11/1985 | Hirai | 350/357 |
| 4,585,312 | 4/1986 | Ishiwata et al. | 350/357 |
| 4,644,934 | 2/1987 | Kaus | 126/435 |
| 4,715,691 | 12/1987 | Sata et al. | 350/357 |
| 4,726,664 | 2/1988 | Tada et al. | 359/270 X |
| 4,750,816 | 6/1988 | Ito et al. | 350/357 |
| 4,775,227 | 10/1988 | Silver | 350/357 |
| 4,832,468 | 5/1989 | Ito et al. | 350/357 |
| 4,872,745 | 10/1989 | Fujisawa et al. | 350/357 |
| 4,874,229 | 10/1989 | Ito et al. | 350/357 |
| 4,886,572 | 12/1989 | Kimura et al. | 156/633 |
| 4,902,108 | 2/1990 | Byker | 350/357 |
| 5,057,248 | 10/1991 | Matsuda et al. | 252/582 |

FOREIGN PATENT DOCUMENTS

| | | | |
|---|---|---|---|
| 0160572 | 12/1979 | Japan | 350/357 |
| 195182 | 11/1982 | Japan | 350/357 |
| 58115420 | 7/1983 | Japan | 350/357 |
| 0039627 | 3/1985 | Japan | 350/357 |
| 0031828 | 2/1987 | Japan | |
| 2289830 | 11/1990 | Japan | |

Primary Examiner—Robert L. Stoll
Assistant Examiner—C. Harris
Attorney, Agent, or Firm—Oblon, Spivak, McClelland, Maier & Neustadt

[57] ABSTRACT

An electrolyte for electrochromic elements which comprises an electrolytic base material to conduct ions and charge-controlling substances contained in the electrolytic base material. The electrolytic base material is composed of a polar organic solvent and a supporting electrolyte and the charge-controlling substance is at least one of oxidizable substances and reducible substances. This electrolyte enables to produce durable electrochromic elements which can balance the charges in both electrodes and avoid a residual color or an uneven color of coloring materials.

10 Claims, 3 Drawing Sheets

ELECTROLYTE FOR ELECTROCHROMIC ELEMENTS

This application is a continuation of application Ser. No. 07/515,437 filed on Apr. 27, 1990, now abandoned.

FIELD OF THE INVENTION

The present invention relates to an electrolyte for electrochromic elements used as dimming devices and display units.

DESCRIPTION OF THE RELATED ART

The electrochromic element has many characteristic properties which LEDs (light-emitting diodes) and LCDs (liquid crystal displays) do not have. It permits an electrochemical reaction to take place therein by an externally applied voltage; as the result, it reversibly changes in color and absorbance. Attempts are being made to put it into practical use as a dimming device or a element unit in the electronics and other industries.

There is known one type of electrochromic element which is made up of a pair of electrodes and electrochromic materials (e.g., tungsten oxide and polyaniline) and electrolyte. The latter two are interposed between said electrodes. When a voltage is applied across the electrodes, the electrochromic materials take on a color or becomes colorless.

The conventional electrolyte used for this type of electrochromic element is one which is formed by dissolving a salt (e.g., lithium perchlorate and lithium tetrafluoroborate) in a polar organic solvent (e.g., propylene carbonate). This electrolyte is so stable chemically and electrochemically that it does not undergo oxidation nor reduction on the electrodes so long as the electrochromic element is operated under normal conditions. And the electrochromic material alone undergoes oxidation and reduction on the electrodes. After repeated voltage application or light irradiation, the paired electrodes lose their charge balance, with one electrode charged more than the other. As a result, the electrochromic material does not completely return to its original state but remains taking on a color.

One possible way to eliminate this residual color is to apply a high reverse voltage across the electrodes, thereby neutralizing the residual charges. However, applying a high reverse voltage shortens the life of the electrochromic element, rendering coloration and bleaching uneven.

The other possible way proposed so far to address the problem of the residual color is to place between the paired electrodes a third electrode for dissipating accumulated charges from one of the electrodes. This idea, however, is of no practical use because the addition of a third electrode complicates the structure of the electrochromic element and thickens the electrolyte in the electrochromic element.

For the electrochromic element to be put to practical use such as a dimming glass, it is necessary to protect the electrodes from unbalanced charges. No means has been found yet to do so.

SUMMARY OF THE INVENTION

In order to address the above-mentioned problems encountered in the prior art, the present inventors carried out a series of researches, which led to the present invention. Accordingly, it is an object of the present invention to provide a lasting electrolyte for electrochromic elements which eliminates the unbalanced charge on the paired electrodes and hence prevents the electrochromic material from forming a residual color.

The gist of the present invention resides in an electrolyte for electrochromic elements which comprises an electrolytic base material to conduct ions and charge-controlling substances contained in said electrolytic base material.

According to the present invention, the electrolyte for electrochromic elements eliminates the unbalanced charge on the paired electrodes and hence prevents the electrochromic material from forming a residual color.

The electrolyte of the present invention contains charge-controlling substances which are oxidized or reduced for consuming extra charges. The oxidizable one undergoes oxidation according to the following reaction equation.

$$RED1 \rightarrow OX1 + e^- \qquad (1)$$

(Where RED1 represents a oxidizable charge-controlling substance and OX1 represents an oxidant of RED1.) On the other hand, the reducible one undergoes reduction according to the following reaction equation.

$$OX2 + e^- \rightarrow RED2 \qquad (2)$$

(where OX2 represents a reducible charge-controlling substance and RED2 represents a reductant of OX2). In other words, the charge-controlling substances release or absorb electrons.

The charge-controlling substance works in the following manner to eliminate charges remaining on the electrode, thereby preventing the residual color. Assume that positive charges are remaining on the oxidative coloring electrode when the color is to be bleached. In this situation, the oxidizable charge-controlling substance becomes oxidized on the counter electrode when a bleaching voltage is applied. The oxidation generates electrons which move to the oxidative coloring electrode through the external circuit and neutralize the remaining positive charges. Thus the oxidative coloring substance becomes bleached completely. Similarly, assume that negative charges are remaining on the reductive coloring electrode when the color is to be bleached. In this situation, the reducible charge-controlling substance becomes reduced on the counter electrode when a bleaching voltage is applied. The reduction absorbs electrons which are supplied from the reductive coloring electrode through the external circuit and the remaining negative charges are neutralized. Thus the reductive coloring substance becomes bleached completely.

In addition, the oxidation and reduction of the charge-controlling substance can be accomplished by the application of a low bleaching voltage. This obviates the application of a high voltage which shortens the life of electrochromic elements.

The above and other objects, features, and advantages of the present invention will become more apparent from the following description when taken in conjunction with the accompanying drawings in which a preferred embodiment of the invention is shown by way of illustrative example.

DESCRIPTION OF THE PREFERRED EMBODIMENTS

Figure 1:
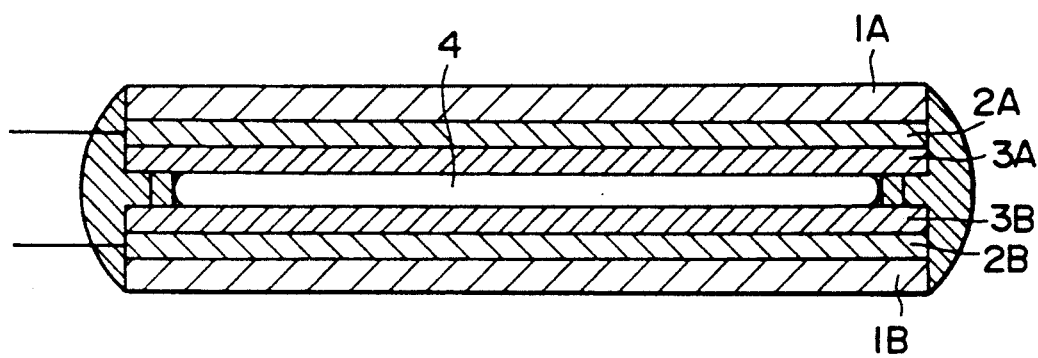
FIG. 1 is a sectional view showing an example of an electrochromic element.

According to the present invention, the electrolyte for electrochromic elements comprises an electrolytic base material to conduct ions and charge-controlling substances contained in said electrolytic base material.

In general, the charge-controlling substance should preferably be one which has at least one oxidation potential more positive than the coloring potential region of the coloring substance or has at least one reduction potential more negative than the coloring potential region of the coloring substance. The reason for this is given below. If the charge-controlling substance has an oxidative or reductive potential which is within the range of potentials for the electrochromic material to be colored or bleached normally, the chargecontrolling substance undergoes reactions together with the coloring reaction of the electrochromic materials. And this undesirably reduces the coloring effect of the electrochromic element.

The charge-controlling substance is either an oxidizable substance or a reducible substance. At least one of them is used in the present invention. The oxidizable substance is oxidized to release electrons and the reducible substance is reduced to absorb electrons.

Examples of the oxidizable substance include halogen ions such as iodide ion, bromide ion, and chloride ion, metalocenes (bis(cyclo penthadienyl)metal(II)compound) such as cobaltocene, ferrocene, and nickelocene, and derivatives thereof. At least one of them is used in the present invention. Examples of the reducible substance include metalocinium ions (bis(cyclo penthadienyl) metal(III)compound) such as cobalticinium ion and ferricinium ion and derivatives thereof. At least one of them is used in the present invention.

The charge-controlling substance should preferably be contained in the electrolyte in the form of a solute.

The content of the charge-controlling substance should preferably be in the range of 0.001 to 0.1 mol per liter of the electrolyte. With a content less than 0.001 mol/l, the charge-controlling substance does not produce the effect of eliminating the remaining charges as desired. With a content more than 0.1 mol/l, the charge-controlling substance reduces the coloring efficiency of the electrochromic material.

The electrolytic base material to conduct ions, which contains charge-controlling substances, may be an electrolytic solution consisting of polar organic solvents and supporting electrolytes. It may be used in semisolid or solid form by incorporating polymeric substances. Furthermore, it may also be used in solid form by ultraviolet curing after being hardened by exposure to ultraviolet rays.

Examples of the polar organic solvent include γ-butyrolactone, propylene carbonate, ethylene carbonate, dimethoxyethane, and tetrahydrofuran. At least one kind of them should be used. Examples of the supporting electrolyte include lithium perchlorate, lithium tetrafluoroborate, lithium hexafluorophosphate, lithium hexafluoroarsenate, and lithium trifluoromethane sulfonate. At least one kind of them should be used.

The electrolyte pertaining to the present invention may be applied to any type of electrochromic element, which is made up of a pair of opposite substrates 1A and 1B, a pair of opposite electrodes 2A and 2B arranged between the substrates 1A and 1B, and electrochromic materials 3A and 3B and electrolyte 4 arranged between the electrodes 2A and 2B, as shown in FIG. 1.

The electrolyte pertaining to the present invention may also be applied to any type of electrochromic element in which the electrochromic material is a combination of polyaniline and $WO_3$, a combination of prussian blue and $WO_3$, a combination of iridium oxide and $WO_3$, or a combination of conducting polymers (such as polypyrrole and polythiophene) and a metal oxide (such as molybdenum oxide).

The electrolyte pertaining to the present invention may also be applied to any type of electrochromic element which employs only one or more than one kind of electrochromic material. It may also be applied to any kind of electrochromic element which employs only one kind of electrochromic material which takes on a color by oxidation or reduction, or which employs two kinds of electrochromic materials which take on a color by oxidation and reduction.

The electrolyte pertaining to the present invention functions in the way explained below, assuming that it is used in an electrochromic element containing two kinds of electrochromic materials--polyaniline and tungsten oxide ($WO_3$), which are colored or bleached at an electric potential of 2 V to 4 V versus the lithium reference electrode. In this electrochromic element, the electrolyte is interposed between an electrode provided with polyaniline (polyaniline electrode) and another electrode provided with tungsten oxide ($WO_3$ electrode).

Polyaniline is known as an oxidative coloring film, and $WO_3$ is known as a reductive coloring film. In other words, when the electrochromic element is colored, polyaniline is in an oxidized state and $WO_3$ is in a reduced state. Conversely, when the electrochromic element is bleached, polyaniline is in a reduced state and $WO_3$ is in an oxidized state. It is known that the coloring and bleaching reactions of the coloring electrodes occur at a potential of about 2 V to 4 V versus the lithium reference electrode. At a coloring reaction, each coloring electrode is supplied with the same amount of charge electrons whose polarity is opposite. In the case of bleaching, however, a small portion of the charge often remains in one of coloring electrodes, resulting in the unbalance of the charge of the electrodes. This is caused by differences of reversibility and retentivity of charges between both electrodes. Even though the amount of unbalanced charge is very small at each coloring/bleaching cycle, the repetition of the cycle accumulates the charge amount of unbalanced charge to retain color even after bleaching.

The color remaining phenomenon is illustrated with reference to the following instance. When the polyaniline-$WO_3$ electrochromic element is operated by applying a coloring voltage of $+1.2$ V and a bleaching voltage of $-1.5$ V alternately for 5 seconds each (the voltage being a terminal voltage of the polyaniline electrode versus the $WO_3$ electrode), the element repeatedly takes on a dark blue color and then becomes colorless completely in the initial stage. After about 10,000 repetitions of the alternate voltage application, the electrochromic element begins to take on a yellowish green color even when it is bleached. This residual color is attributable to the fact that the polyaniline electrode is not too completely reduced to consume all positive charges, even when the element is bleached. To eliminate this residual color, it has been necessary to apply a negative bleaching voltage as great as −3.0 V to the element. This bleaching voltage oxidatively decomposes the electrolyte on the WO$_3$ electrode to neutralize the residual charges on the polyaniline electrode. Furthermore, the application of such a great bleaching voltage considerably shortens the life of the electrochromic element, and results in uneven coloring and bleaching. In another experiment, the above-mentioned electrochromic element is operated by applying a coloring voltage of +1.2 V for 5 seconds and then applying a bleaching voltage of −1.5 V for 5 seconds after standing open circuit for 1 hour. In this case, the element does not become completely colorless but retains a blue color even when it is bleached. This is caused by the fact that the WO$_3$ electrode is not too completely oxidized to consume all negative charges even when the element is bleached. To eliminate this residual color, it is also necessary to apply a negative bleaching voltage as great as −3.0 V to the element. This again considerably shortens the life of the electrochromic element.

Applying a high bleaching voltage to eliminate the residual color shortens the life of the electrochromic element as mentioned above. An alternative means to eliminate the residual color is to incorporate the electrolyte with oxidizable substances or reducible substances which keeps balancing the charge in the following manner.

Assume that the electrolyte contains an oxidizable substance which will be oxidized at about 4 V (versus the lithium reference electrode) and a reducible substance which will be reduced at about 2 V (versus the lithium reference electrode), and the oxidizable and reducible substances undergo reactions according to the following equation.

$$RED1 \rightarrow OX1 + e^- \quad (1)$$

$$OX2 + e^- \rightarrow RED2 \quad (2)$$

(where RED1 represents an oxidizable substance, OX1 represents an oxidant of RED1, OX2 represents a reducible substance, and RED2 represents a reductant of OX2)

The reactions shown by the equations (1) and (2) do not take place at a potential(versus the lithium reference electrode) between 2 V and 4 V, at which polyaniline and WO$_3$ undergo the coloring and bleaching reactions. However, if the charge unbalance takes place and some charges remain in each of electrodes, the potential of the counter electrode to the charged electrode exceeds above mentioned potential region and then each of the reactions shown by equations (1) and (2) occurs. If this potential is higher than 4 V, the reaction of equation (1) proceeds; and if this potential is lower than 2 V, the reaction of equation (2) proceeds.

The problem associated with residual color on the polyaniline electrode is discussed below. According to the conventional technology, the electrolyte does not contain an oxidizable compound which is oxidized on the WO$_3$ electrode and supplies electrons to bleach polyaniline completely. Therefore, it was necessary to apply an excessively large negative bleaching voltage (about −3 V) to the electrochromic element, thereby subjecting the electrolyte to the oxidative decomposition reaction on the WO$_3$ electrode in order to bleach polyaniline. In contrast, according to the technology of the present invention, the oxidation reaction represented by equation (1) readily takes place on the WO$_3$ electrode, supplying the polyaniline electrode with electrons to neutralize its residual positive charges. In this way it is possible to bleach the polyaniline electrode completely. By the same token it is also possible to bleach the WO$_3$ electrode completely in the case where residual color occurs on the WO$_3$ electrode. In this case, the reduction reaction represented by equation (2) takes place on the polyaniline electrode. As mentioned above, the problem associated with residual colors on both electrodes can be solved by incorporating the electrolyte with an oxidizable substance and a reducible substance.

According to the present invention, the electrolyte contains charge-controlling substances which is at least one member selected from the group consisting of oxidizable substances and reducible substances. The electrolyte may contain both an oxidizable substance and a reducible substance for the electrochromic element fabricated by a combination of an oxidative coloring material and a reductive coloring material. In the case where either of the coloring materials poses the problem of residual color, either oxidative coloring material or a reductive coloring material works so that residual charges are consumed completely. Also, the electrolyte may contain an oxidizable substance alone if the electrochromic element employs only one oxidative coloring material or the electrolyte may contain a reducible substance alone if the electrochromic element employs only one reductive coloring material. Nevertheless, it is desirable that the electrolyte contains both an oxidizable substance and a reducible substance even though the electrochromic element employs either oxidative coloring material or a reductive coloring material. The reason why this is true is that there is a possibility that charges accumulate also in the counter electrode of the coloring electrode and this polarizes the coloring electrode enough to deteriorate with repeating the coloring and bleaching cycle.

Having generally described this invention, a further understanding can be obtained by reference to certain specific examples which are provided herein for purposes of illustration only and are not intended to be limiting unless otherwise specified.

EXAMPLE 1

An electrochromic element was fabricated from coloring elements and the electrolyte containing an oxidizable substance. Polyaniline and WO$_3$ were employed as the coloring substances and any one of chloride ion, bromide ion, iodide ion, acetylferrocene, and 1,1,-diacetylferrocene was employed as an oxidizable substance. This element was tested for the voltage required to eliminate residual color on the polyaniline electrode.

The electrolyte used has the composition as shown in Table 1. For comparison, the performance of an electrolyte containing no charge controlling substance was evaluated.

TABLE 1

| Sample No. | Oxidizable Substance (concentration) | Supporting electrolyte (concentration) | solvent |
| --- | --- | --- | --- |
| Sample 1 | Lithium chloride (10 mM) | Lithium tetrafluoroborate (1 M) | Propylene carbonate |
| Sample 2 | Lithium bromide (10 mM) | Lithium tetrafluoroborate (1 M) | Propylene carbonate |
| Sample 3 | Lithium iodide (10 mM) | Lithium tetrafluoroborate (1 M) | Propylene carbonate |
| Sample 4 | Acetyl ferrocene (10 mM) | Lithium tetrafluoroborate (1 M) | Propylene carbonate |
| Sample 5 | 1,1'-diacetyl ferrocene (10 mM) | Lithium tetrafluoroborate (1 M) | Propylene carbonate |
| Comparative Example | None | Lithium tetrafluoroborate (1 M) | Propylene carbonate |

Figure 2:
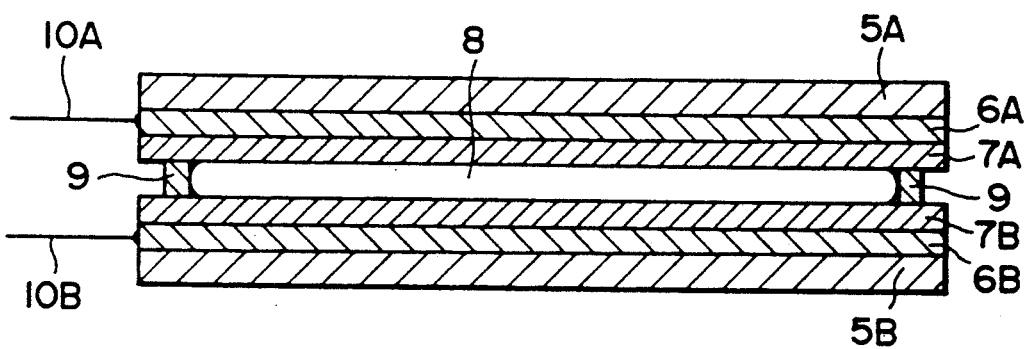
FIG. 2 is a sectional view showing an electrochromic element used in one example of the present invention.

The electrochromic element is constructed as shown in FIG. 2. It has a pair of substrates 5A and 5B and a pair of transparent filmy electrodes 6A and 6B arranged between said substrates and kept apart by a spacer 9. The transparent filmy electrode 6A is coated with a polyaniline film 7A, and the transparent filmy electrode 6B is coated with a $WO_3$ film 7B. Between the polyaniline film and the $WO_3$ film is interposed the electrolyte 8. To the respective ends of the transparent filmy electrodes 6A and 6B are connected a pair of lead wires 10A and 10B, through which a voltage is applied to the transparent filmy electrodes 6A and 6B.

The experiment was carried out as follows: The polyaniline electrode (coated with polyaniline film) and the $WO_3$ electrode (coated with $WO_3$ film) were individually bleached completely. Only the polyaniline electrode was colored by positive polarization (5 mC per $cm^2$ of the electrode area were supplied). The $WO_3$ electrode (which is completely bleached), the polyaniline electrode (which is incompletely colored), and the electrolyte shown in Table 1 were combined to form the specimen of the electrochromic element whose polyaniline electrode has a residual color.

Figure 3:
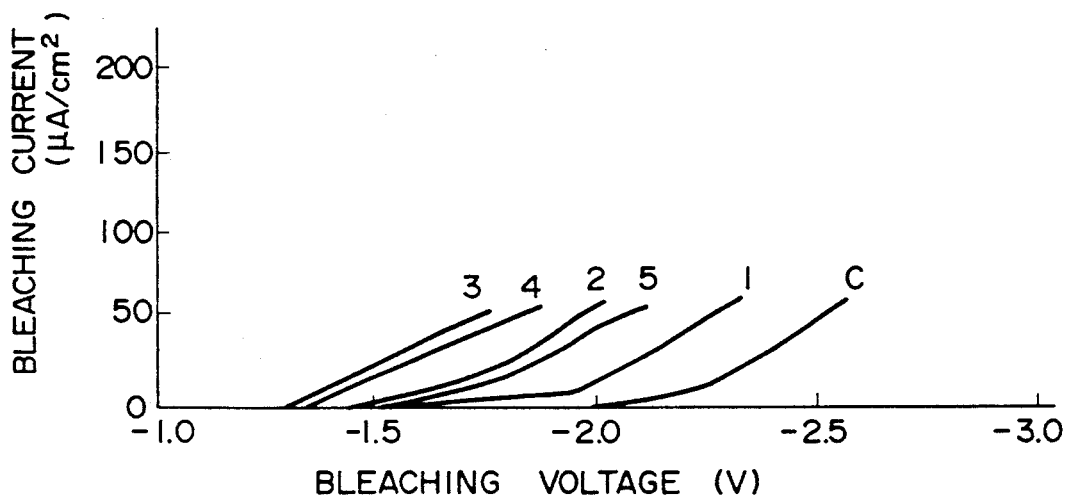
FIGS. 3 and 4 are graphs showing the relationship between the bleaching voltage and the bleaching current in the electrochromic elements in Examples 1 and 2 of the present invention.

The specimens of the electrochromic elements were tested for bleaching voltage (which is the terminal voltage of the polyaniline electrode versus the $WO_3$ electrode) and bleaching current. The relationship between the bleaching voltage and the bleaching current is shown in FIG. 3 (Numbers in FIG. 3 correspond to Sample Nos. in Table 1). The bleaching current represents the speed at which the residual color on the polyaniline electrode disappears.

It is noted from FIG. 3 that the bleaching current rises at lower bleaching voltages (absolute values) or the residual color on the polyaniline electrode disappears at lower bleaching voltages in Example according to the present invention than in Comparative Example.

The specimens were also tested for the bleaching voltage at which the color of polyaniline disappears at a sufficiently high speed. The bleaching voltage which the bleaching current exceeds 50 $\mu A/cm^2$ are shown in Table 2. It is noted from Table 2 that the electrolyte used in this example permits bleaching to take place at a lower voltage (absolute value).

EXAMPLE 2

An electrochromic element of the same type as in Example 1 was fabricated from the coloring substances

TABLE 2

| Sample No. | Voltage at which bleaching current reaches 50 $\mu A/cm^2$ |
| --- | --- |
| Sample 1 | −2.2 V |
| Sample 2 | −1.9 V |
| Sample 3 | −1.7 V |
| Sample 4 | −1.8 V |
| Sample 5 | −2.0 V |
| Comparative Example | −2.5 V | and the electrolyte containing a reducible substance. Polyaniline and $WO_3$ were employed as the coloring substances and cobalticinium ion was employed as a reducible substance. It was tested for the voltage required to eliminate residual color on the $WO_3$ electrode.

The electrolytes used here have the composition as shown in Table 3. For comparison, the performance of an electrolyte containing no charge controlling substance was evaluated.

TABLE 3

| Sample No. | Reducible Substance (concentration) | Supporting electrolyte (concentration) | solvent |
| --- | --- | --- | --- |
| Sample 6 | Cobalticinium hexafluorophosphate (10 mM) | Lithium tetrafluoroborate (1 M) | Propylene carbonate |
| Comparative Example | None | Lithium tetrafuoroborate (1 M) | Propylene carbonate |

The experiment was carried out as follows: The polyaniline electrode and the $WO_3$ electrode were individually bleached completely. Only the $WO_3$ electrode was colored by negative polarization (5 mC per $cm^2$ of the electrode area were supplied). The polyaniline electrode (which is completely bleached), the $WO_3$ electrode which is incompletely colored), and the electrolyte shown in Table 3 were combined to form the specimens of the electrochromic element whose $WO_3$ electrode has a residual color.

Figure 4:
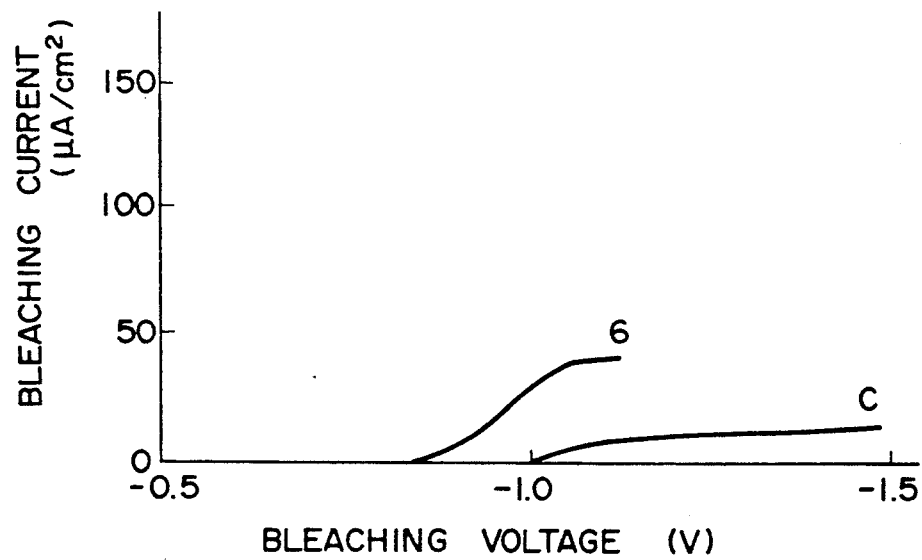

The specimens were tested for bleaching voltage which is the terminal voltage of the polyaniline electrode versus the $WO_3$ electrode) and bleaching current. The relationship between the bleaching voltage and the bleaching current is shown in FIG. 4 (Numbers in FIG. 4 correspond to Sample Nos. in Table 3). The bleaching current represents the speed at which the residual color on the $WO_3$ electrode disappears.

It is noted from FIG. 4 that the bleaching current rises at lower bleaching voltages (absolute values) or the residual color on the $WO_3$ electrode disappears at lower bleaching voltages in Example according to the present invention than in Comparative Example.

The specimens of the electrochromic elements in this example were examined for how many coloring and bleaching cycles were required for the residual color to disappear. The coloring and the bleaching were potentiostatically achieved by the application of a square wave with an upper voltage level of +1.2 V and a lower voltage level of −1.5 V or −2.0 V (bleaching). The wave has a pulse width of 10 seconds. The number of cycles required for the residual color to disappear was recorded and the change in color of the electrochromic element was observed after 50 cycles. The results are shown in Table 4.

The electrolyte used has the composition as shown in Table 5. For comparison, the performance of an electrolyte containing no reducible substance was evaluated.

TABLE 5

| Sample No. | Charge controlling Substance (concentration) | Supporting electrolyte (concentration) | solvent |
| --- | --- | --- | --- |
| Sample 7 | Cobalticinium bromide (10 mM) | Lithium tetrafluoroborate (1 M) | Propylene carbonate |
| Comparative Example | None | Lithium tetraflurorborate (1 M) | Propylene carbonate |

The electrochromic elements underwent coloring and bleaching 100,000 times repeatedly by the application of a coloring voltage of +1.2 V and a bleaching voltage of −1.0 V. Before and after the repeated coloring and bleaching, the electrochromic elements were tested for transmittance for the light of wavelength 550 nm. The results are shown in Table 6.

TABLE 4

| Sample No. | Coloring voltage (V) | Bleaching voltage (V) | Cycles required for residual color to disappear | Visual observation after 50 cycles |
| --- | --- | --- | --- | --- |
| Sample 6 | +1.2 | −1.5 | 30 | Completely bleached |
|  | +1.2 | −2.0 | 10 | Completely bleached |
| Comparative Example | +1.2 | −1.5 | more than 100 | Residual color remained |
|  | +1.2 | −2.0 | 40 | Uneven coloring |

Table 4 indicates the following. In the case of the electrochromic element containing the comparative electrolyte, the residual color is not completely eliminated by the application of a bleaching voltage of −1.5 V but it is finally eliminated by the repeated application of a bleaching voltage of −2.0 V while leaving an uneven color on the electrochromic element. This is caused by that the application of a bleaching voltage of −2.0 V for eliminating the residual color on the $WO_3$ elecreduce the transparent filmy electrode used for the polyaniline electrode and increases locally the resistance of the reduced transparent filmy electrode. By contrast, in the case of the electrochromic element containing the electrolyte of the present invention, the residual color was completely eliminated by a less number of cycles at both of the bleaching voltages employed, and the uneven coloring and bleaching did not occur after the removal of the residual color. In addition, it was also found that the electrolyte of the present invention produces the effect of protecting the transparent filmy electrode.

EXAMPLE 3

An electrochromic element of the same type as in Example 1 was fabricated from a polyaniline, a $WO_3$ and an electrolyte. The electrolyte contained bromide ion as a oxidizable substance and cobalticinium ion as a reducible substance. It was tested for how it changes, after repeated coloring and bleaching, in transmittance in the bleached state.

| Sample No. | Initial transmittance | Transmittance after 100,000 cycles |
| --- | --- | --- |
| Sample 7 | 75% | 75% |
| Comparative Example | 75% | 50% |

It is noted from Table 6 that the electrochromic element in comparative example decreased in transmittance in the bleached state after it had undergone the coloring and bleaching cycles 100,000 times. This is attributed to the residual color caused by the charge accumulation in the polyaniline electrode. The charge accumulation is resulted from the difference in reversibility between the electrochemical reaction of a polyaniline and that of a $WO_3$. By contrast, the electrochromic element of the present invention does not show the residual color even after 100,000 cycles of coloring and bleaching. This indicates that the electrolyte produces the effect of balancing charges on both electrodes.

EXAMPLE 4

An electrochromic element of the same type as in Example 1 was fabricated from coloring substances and an electrolyte containing an oxidizable substance. Prussian blue and $WO_3$ were employed as the coloring substances and lithium bromide was employed as an oxidizable substance. The electrolyte used has the composition as shown in Table 7. For comparison, the performance of an electrolyte containing no charge controlling substance was evaluated.

TABLE 7

| Sample No. | Oxidizable Substance (concentration) | Supporting electrolyte (concentration) | solvent |
| --- | --- | --- | --- |
| Sample 8 | Lithium bromide (10 mM) | Lithium tetrafluoroborate (1 M) | Propylene carbonate |
| Comparative Example | None | Lithium tetrafluoroborate (1 M) | Propylene carbonate |

Figure 5:
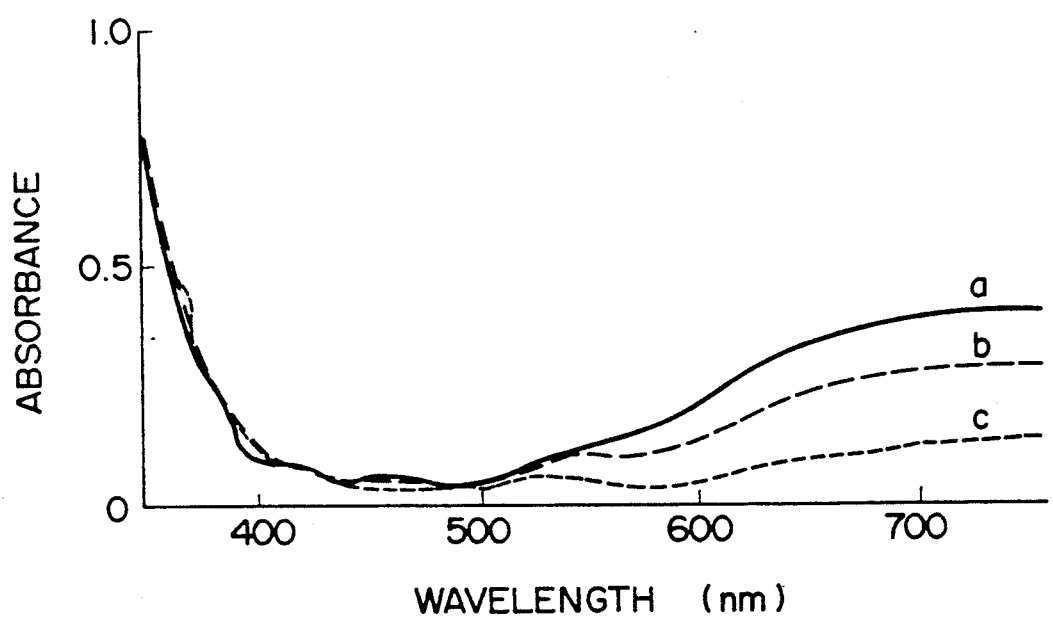
FIG. 5 is a graph showing the visible light absorption spectrum of the electrochromic element in Example 4 of the present invention.

It is known that a Prussian blue electrode has the poor retentivity of a color, especially a bleached color. This is why the electrochromic element made up from Prussian blue and $WO_3$ takes on a blue color when it is allowed to stand in the bleached state (this is indicated by the solid line a of the visible light absorption spectrum in FIG. 5). This blue color is not eliminated completely by the application of a bleaching voltage of $-1.5$ V (the terminal voltage of the Prussian blue electrode versus the $WO_3$ electrode) so long as the electrochromic element contains the conventional electrolyte. (The absorption spectrum after bleaching is indicated by the broken line b in FIG. 5.) By contrast, in the case of the electrochromic element of the present invention, which employs the electrolyte containing 10 mM of bromide ion as the oxidizable substance, the residual color is almost completely eliminated as indicated by the dotted line c in FIG. 5.

What is claimed is:

1. An electrochromic element comprising:
   a solid oxidative coloring electrode comprising polyaniline having a coloring potential and a bleaching potential,
   a solid reductive coloring electrode comprising $WO_3$, and
   at least one electrolyte comprising a conventional electrolytic base material to conduct ions and at least one oxidizable charge-controlling substance selected from the group consisting of halogen ions, metalocenes, acetylferrocene and 1,1'-diacetylferrocene, said oxidizable charge-controlling substance being dissolved in said electrolytic base material and having an oxidation potential, wherein said oxidation potential is more positive than said coloring potential of said solid oxidative coloring electrode, but is not within the range of said coloring potential and said bleaching potential of said solid oxidative coloring electrode.

2. An electrochromic element comprising
   a solid oxidative coloring electrode comprising polyaniline,
   a solid reductive coloring electrode comprising $WO_3$, and
   at least one electrolyte comprising a conventional electrolytic base material to conduct ions and at least one charge-controlling substance dissolved in said electrolytic base material, said charge-controlling substance being present at a concentration of from 0.001 to 0.1M,
   wherein each of said solid coloring electrodes has a coloring potential and a decoloring potential, and said charge-controlling substance undergoes oxidation, reduction, or both oxidation and reduction at a reaction potential outside but not within the range of values from said coloring potential of said solid coloring electrodes to said decoloring potential of said solid coloring electrodes.

3. An electrochromic element comprising at least two electrodes, at least one coloring material, at least one electrolyte comprising a conventional electrolytic base material to conduct ions and at least one reducible charge-controlling substance selected from the group consisting of metalocinium ions, said coloring material having a coloring potential and a bleaching potential, and said reducible charge-controlling substance being dissolved in said electrolytic base material and having a reduction potential, wherein said reduction potential is more negative than said coloring potential of said reductive coloring electrode, but is not within the range of said coloring potential and said bleaching potential of said coloring substance.

4. An electrochromic element comprising at least two electrodes, at least one coloring material, at least one electrolyte comprising an electrolytic base material to conduct ions and cobalticinium bromide, said cobalticinium bromide being dissolved in said electrolytic base material in a concentration of 0.01M.

5. An electrochromic element comprising at least two electrodes, at least one coloring material, at least one electrolyte comprising a conventional electrolytic base material to conduct ions, and at least one charge-controlling substance dissolved in said electrolytic base material, wherein said electrolytic base material is in a solid or semi-solid state and is composed of at least one polar organic solvent selected from the group consisting of γ-butyrolactone, propylene carbonate, ethylene carbonate, dimethoxyethane and tetrahydrofuran and at least one conventional supporting electrolyte, said coloring material has a coloring potential and a decoloring potential, and said charge-controlling substance undergoes oxidation, reduction, or both oxidation and reduction at a reaction potential outside but not within the range of values from said coloring potential to said decoloring potential.

6. The electrochromic element of claim 5, wherein said charge-controlling substance is selected from the group consisting of halogen ions, metalocenes, acetylferrocene, 1,1'-diacetylferrocene and metalocinium ions.

7. The electrochromic element of claim 6, wherein said charge-controlling substance is selected from the group consisting of bromide, iodide, metalocenes, acetylferrocene, 1,1'-diacetylferrocene and metalocinium ions.

8. The electrochromic element of claim 6, wherein said charge-controlling substance is present at a concentration of from 0.001 to 0.1M.

9. An electrochromic element comprising at least two electrodes, at least one coloring material, at least one electrolyte comprising a conventional electrolytic base material to conduct ions, and at least one charge-controlling substance dissolved in said electrolytic base material; wherein said electrolytic base material is in a solid or semi-solid state and is composed of at least one supporting electrolyte selected from the group consisting of lithium perchlorate, lithium tetrafluoroborate, lithium hexafluorophosphate, lithium hexafluoroarsenate and lithium trifluoromethane sulfonate and at least one polar organic solvent selected from the group consisting of γ-butyrolactone, propylene carbonate ethylene carbonate, dimethoxyethane and tetrahydrofuran; and said coloring material has a coloring potential and a decoloring potential, and said charge-controlling substance undergoes oxidation, reduction, or both oxidation and reduction at a reaction potential outside but not within the range of values from said coloring potential to said decoloring potential.

10. An electrochromic element comprising at least two electrodes, at least one coloring material selected from the group consisting of polyaniline, $WO_3$, prussian blue, iridium oxide, polypyrrole, polythiophene and molybdenum oxide, at least one electrolyte comprising a conventional electrolytic base material to conduct ions, and at least one charge-controlling substance dissolved in said electrolytic base material; wherein said electrolytic base material is in a solid or semi-solid state and is composed of at least one polar organic solvent selected from the group consisting of γ-butyrolactone, propylene carbonate, ethylene carbonate, dimethoxyethane and tetrahydrofuran and at least one supporting electrolyte selected from the group consisting of lithium perchlorate, lithium tetrafluoroborate, lithium hexafluorophosphate, lithium hexafluoroarsenate and lithium trifluoromethane sulfonate; and said coloring material has a coloring potential and a decoloring potential, and said charge-controlling substance undergoes oxidation, reduction, or both oxidation and reduction at a reaction potential outside but not within the range of values from said coloring potential to said decoloring potential.

* * * * *